INVENTOR.
WALTER PETERSEN
BY Maybee & Legris
ATTORNEYS

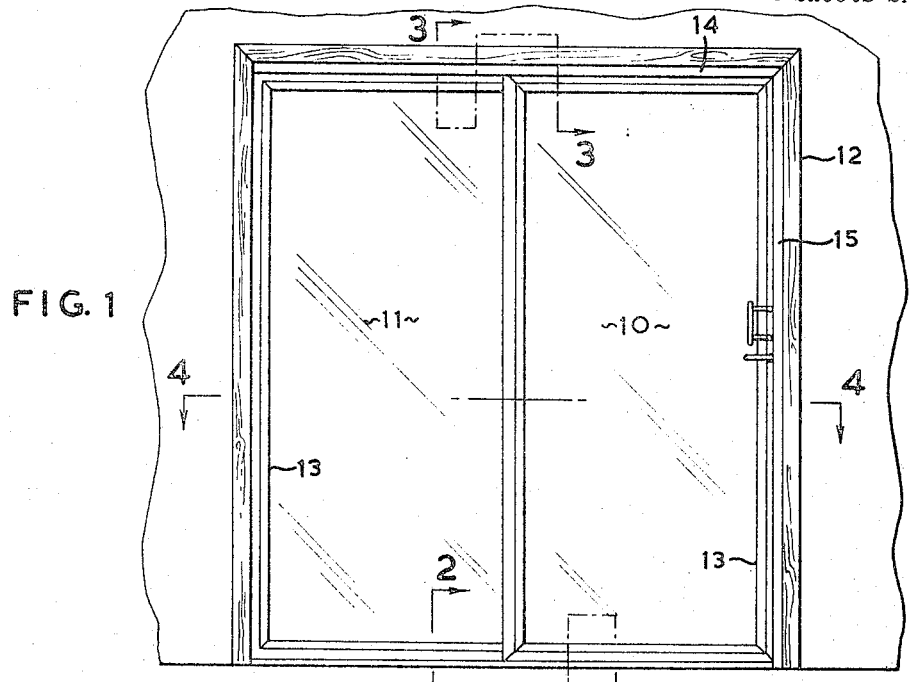
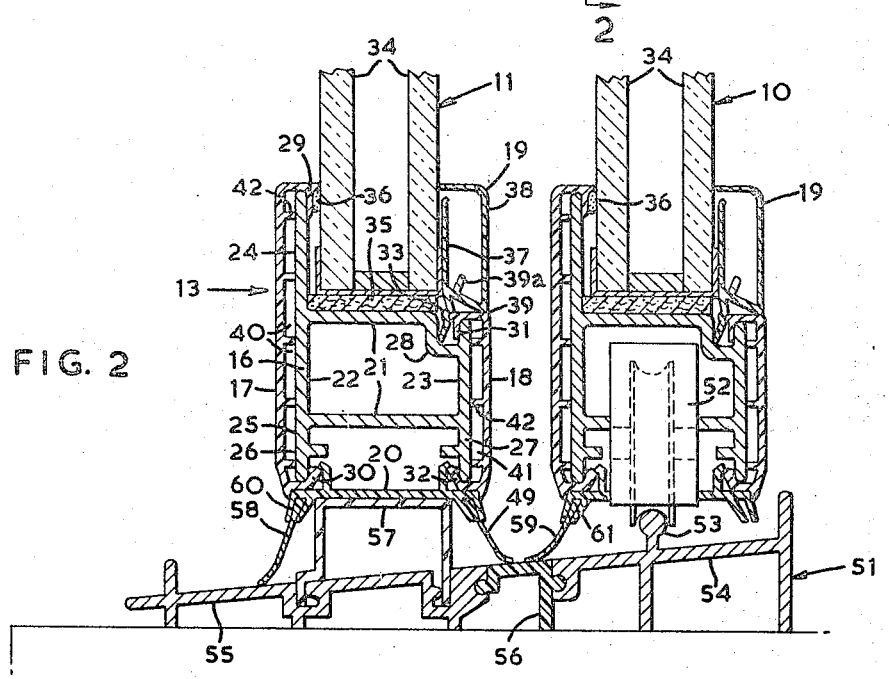

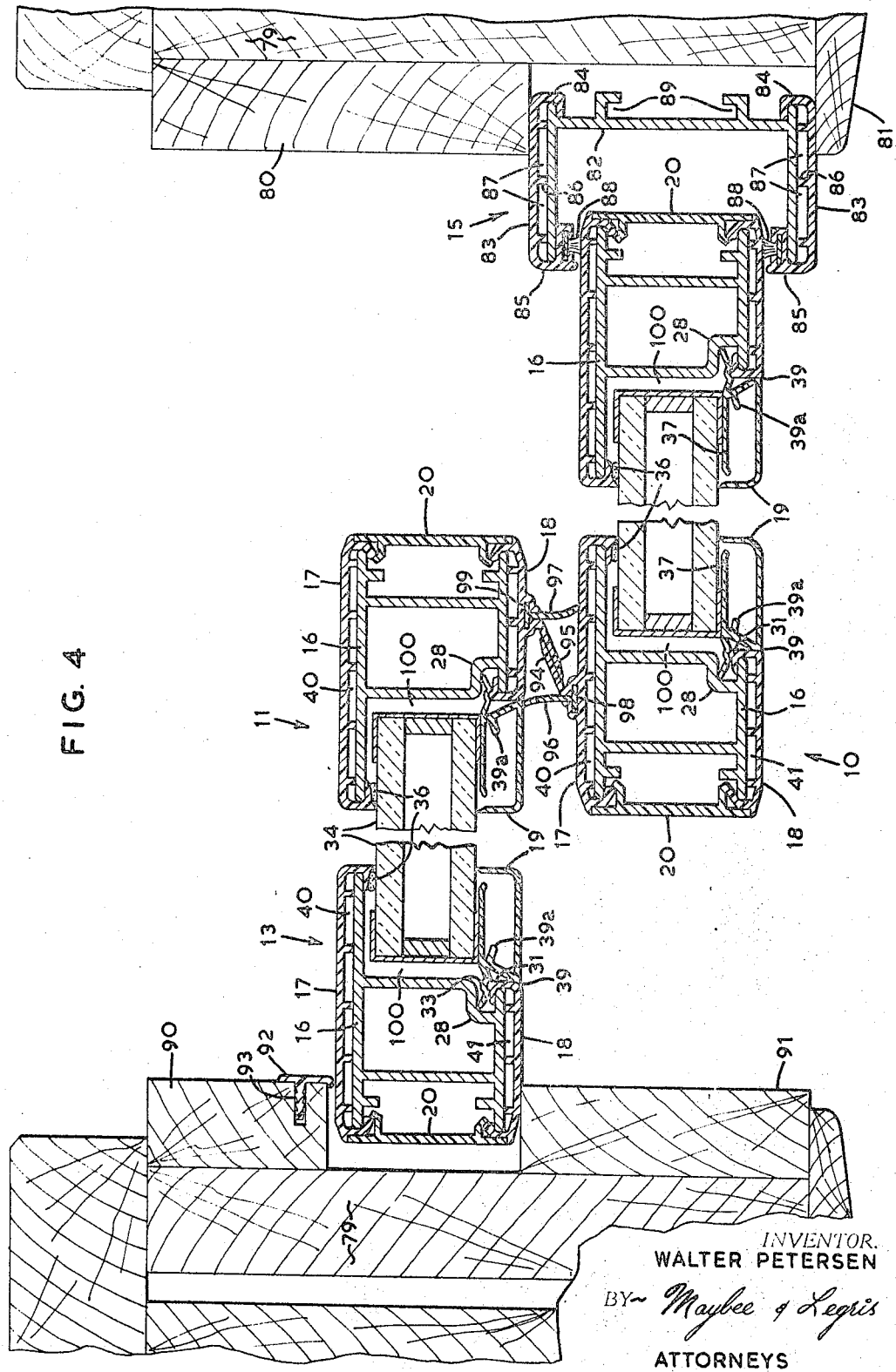

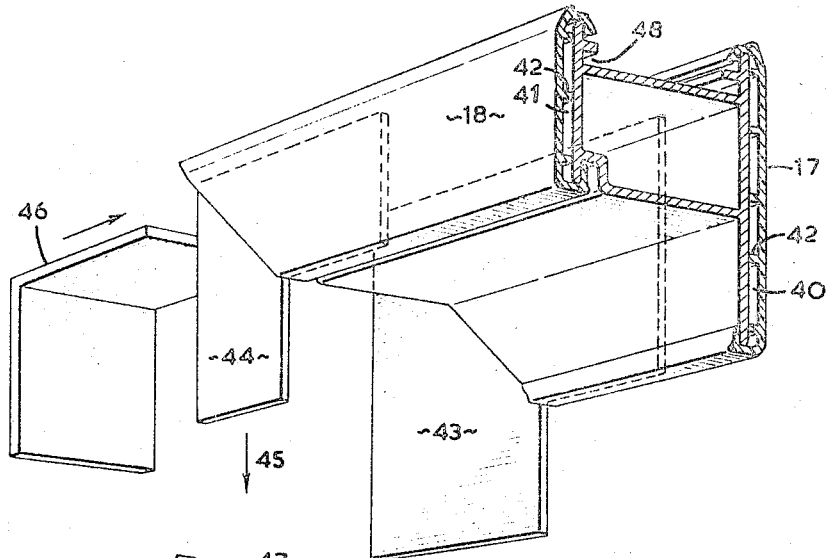
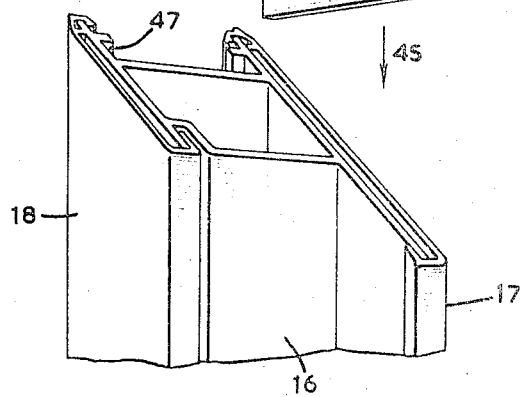
FIG. 5
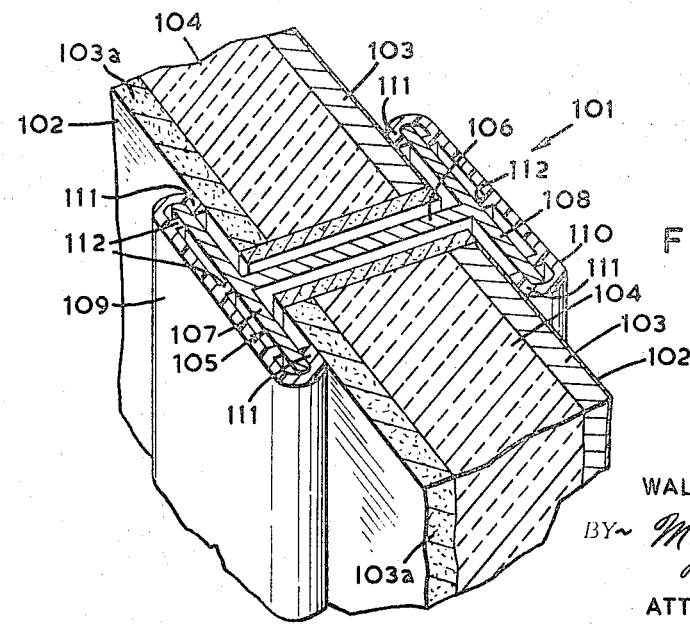
FIG. 7
INVENTOR.
WALTER PETERSEN
BY Maybee & Legris
ATTORNEYS

United States Patent Office 3,348,349
Patented Oct. 24, 1967

3,348,349
REINFORCED PLASTIC GLASS
HOLDING FRAME
Walter Petersen, Erindale, Ontario, Canada, (3177
Winston Churchill Blvd., R.R. 2, Clarkson, Ontario, Canada)
Filed July 19, 1965, Ser. No. 473,091
12 Claims. (Cl. 52—498)

The present invention relates to improved metal frame structures for windows and doors and more particularly to a novel glass pane or panel receiving and holding frame of reinforced material of low thermal conductivity.

The use of metal frame windows and doors, with their permanency and lack of upkeep, has become increasingly important in the building industry in recent years and continual attempts have been made to improve the economy and ease of construction while at the same time improving the durability and appearance of the structure. One of the chief problems besetting metal door and window frames and sash has been the effect of their high thermal conductivity. Condensation and icing problems with these structures have been most acute. These problems have been substantially solved by covering the frames with low conductive sheathing using vinyl or similar material and thereby providing a thermal barrier which is effective in preventing condensation on the inside of the frame. At the same time the sheathing adds a pleasing decorative appearance to the frames.

Unfortunately, prior attempts at sheathing with low conductive materials have generated other acute problems including complexity of construction of the sheathing and extreme difficulty in assembling the rather complex sections of the insulating materials. Because the sections of material are quite complex, and at the same time of a resilient nature, faithful reproduction of the sections on a mass basis has proven to be very difficult to attain.

The novel configuration of thermal insulation for metal frames provided by the present invention, involving the use of covering members all designed to snap fit or slip fit to metal structural members and all having relatively simple sections, permits the easy and economical assembly of an efficiently thermally insulated metal reinforced glass or panel holding frame using members which can be readily and faithfully mass produced.

It is an object of the present invention to provide a thermally insulated glass or panel holding frame composed of members of simple section which are easily and quickly assembled.

Another object of the invention is to provide a novel glass or panel holding frame of attractive appearance which is efficiently thermally insulated with sheathing of low thermal conductivity using members which can be easily and economically produced and attached to a metal structural member.

Other objects and advantages of the invention will be apparent from the following description taken in conjunction with the accompanying drawings in which:

FIGURE 1 is an interior elevational view of a sliding door and a stationary panel utilizing frames embodying the invention;

FIGURE 2 illustrates a sectional view of the bottom frame members of the door and panel taken through line 2—2 of FIGURE 1;

FIGURE 4 is a broken horizontal sectional view of the side frame members of the door and panel taken through line 4—4 of FIGURE 1;

FIGURE 5 depicts an enlarged, exploded view of a corner section of a frame embodying the invention with no glass panel inserted therein;

FIGURE 7 is a sectional plan view of a panel receiving and holding member embodying the invention.

Figure 3:
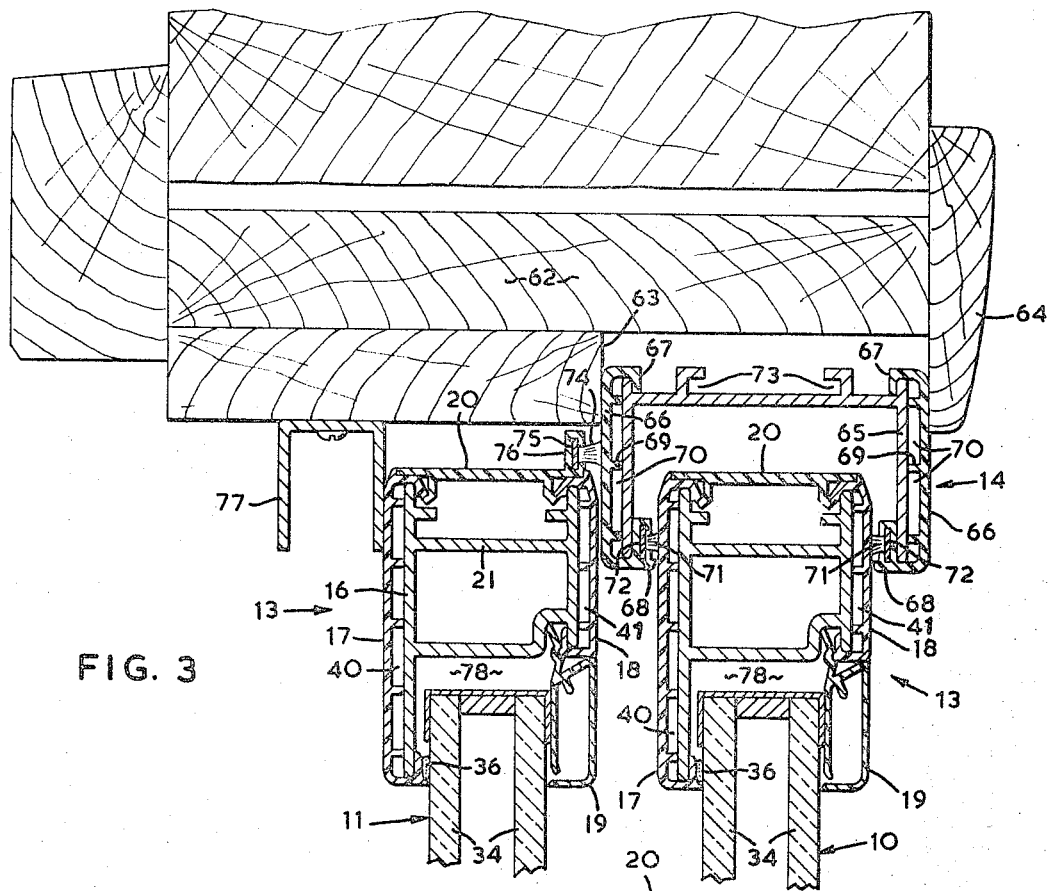
FIGURE 3 shows a sectional view of the top frame members of the door and panel taken through line 3—3 of FIGURE 1.

The present invention relates to a structural panel, which may be glass or other structural material, receiving and holding frame which comprises essentially a rigid metal reinforcing member covered on each of its exposed sides with a fairly rigid but resilient insulating material. The metal reinforcing member has a central web portion and two arms, one at each end of, and extending normally from each side of the web portion. One of the arms at one end of the web portion has an elongated portion extending inwardly in the frame from one side of the web and the web has an upset channel portion located on the opposite end and on the same side of the web as the elongated portion of the one arm. The insulating cover is comprised of a first sheath of rigidly resilient material adapted to engagingly fit over the elongated and remaining portion of the one arm at one end of the web of the reinforcing member, a second sheath of rigidly resilient material adapted to engagingly fit over the other arm at the opposite end of the web, both by a snap-on or slide-on fit, and a spline of rigidly resilient material adapted to be inserted in the upset channel portion of the reinforcing member to form a glass pane or panel receiving opening between the elongated arm of the reinforcing member and the spline. The first and second sheaths advantageously have inner projecting portions located thereon which act to form a space between sheath and reinforcing member. A cover strip of the rigidly resilient insulating material is advantageously engagingly fitted between the first and second sheaths against the uncovered side of the reinforcing member opposite the glass pane or panel receiving opening.

Although the invention is described by way of example primarily in conjunction with covered metal frame doors, it can be seen by the following description with references to the drawings that the invention is equally applicable to either window or door frames. At the same time, the insulated reinforcing member of the present invention is readily adaptable for use with structural building panels.

Referring to the drawings and in particular to FIGURE 1, which shows a sliding door and a stationary panel installed in a door frame and utilizing insulated metal frames embodying the invention, sliding door 10 and stationary panel 11 are shown set in door frame 12. The door and panel each comprises a frame 13 enclosing a glass pane, the frames being covered with a resilient material of low thermal conductivity. The sliding door 10 has its upper end sliding in horizontal metal receiving member 14 and is admitted in the closed position into vertical metal receiving member 15, both of the members 14 and 15 also being covered with resilient material of low thermal conductivity.

Referring now to FIGURES 2, 3 and 4, which illustrate sections taken through the bottom, top and side members, respectively, of the panels and frames shown in FIGURE 1, and which illustrate in detail an embodiment of the novel glass pane or panel receiving and holding structure of the invention, the frame 13 is seen to comprise rigid metal reinforcing members 16 and sheath members 17 and 18, a glazing spline 19 and a cover strip 20 covering the exposed sides of the member 16. All of the members 17, 18, 19 and 20 consist of a stiff, resilient material having low thermal conductivity. Satisfactory materials of low thermal conductivity, that is, good insulating materials, having proper resiliency are obtained from the extrudable, moldable or post-formed thermosetting plastics such as, for example, polyvinyl chloride. Each of the members 17, 18, 19 and 20 is seen to be of of relatively simple section and is found to be easily extrudable and reproducable in mass production.

The integral reinforcing metal member 16 has a web portion 21 centrally disposed therein with an outside arm 22 and an inside arm 23 at either end of and both extending normally from each side of the web. Extending inwardly in the frame on the outside arm 22 is an elongated portion 24 and a first channel portion 25 extends across and outwardly in the frame from the web 21 forming outwardly extending portions 26 and 27 of the arms 22 and 23. A second, smaller, upset channel portion 28 is located adjacent the arm 23 on the side of the web 21, opposite the arm 22 from which the portion 24 projects, with its open side facing inwardly in the frame.

The first, outer sheath member 17 is seen to engagingly fit over and cover the complete outer arm 22 of the metal member 16 with portions 29 and 30 embracing the ends 24 and 26 of the arm 22. The second, inner sheath 18 engagingly fits over and covers the complete inner arm 23 of the metal member with portions 31 and 32 embracing the ends of the inner arm 23. The upset channel portion 28 is seen to accommodate the glazing spline 19 which has an inner arm 33 seated in the channel 28 and engaging the portion 31 of the sheath 18. The spline 19 defines a glass pane receiving opening between itself and the elongated portion 24 of the arm 22.

A double-glazed glass sheet structure 34 is shown placed in the frame 13 but a single sheet may, of course, be placed in the frame with the width of the frame structure being narrowed accordingly and/or the width of the spline 19 being increased. Glazing is accomplished by bedding the glass structure 34 on resilient support means 35 and sealing the exterior face of the glass with a watertight sealant 36 to the portion 29 of the outer sheath 17. The glazing spline 19 is then snapped into place with its inner wall 37 supporting the glass structure 34 and outer wall 38, which is advantageously biased inwardly, providing a positive holding action against the glass structure. The spline 19 is seen to have an outer bearing point 39 on the inner sheath 18. An inwardly projecting leg 39a on the spline 19 permits the easy driving of the spline into position since it facilitates maintaining the end of a tool in contact with that portion, of the inclined wall interconnecting the inner and outer walls 37, 38, which is adjacent to the inner wall 37, the tool being used to urge the inner arm 33 into position in the channel 28. Without the leg 39a the end of the tool would merely slide across the inclined wall interconnecting the inner and outer walls 37, 38 to a position adjacent the outer bearing point 39 in which position it would be virtually impossible to urge the inner arm 33 into position in the channel 28 using the tool.

The open face of the first channel portion 25 of the metal member 16 is covered by the cover strip 20 which engagingly fits across the first channel portion and inwardly embraces the end portions 30 and 32 of the sheaths 17 and 18, respectively. One of the most advantageous features of the invention is that each of the resilient members 17, 18, 19 and 20 can be fitted onto the metal member 16 by a snap-fit or a slide-fit, making assembly of the complete frame 13 a simple and rapidly executed operation. By eliminating the covering of enclosed or inner faces of the metal member 16 by the side sheaths 17 and 18, as has been previously carried out in the prior art, complicated sections of resilient covering material are completely avoided.

Another advantageous feature of the covered frame structure of the invention is the provision of insulating spaces 40 and 41 between the walls of the sheaths 17, 18, respectively, and the metal member 16. The spaces 40 and 41 are made possible by inner projecting portions or ribs 42 on the sheaths which bear against the metal member 16.

There are no mechanical or glued connections between the inner structural member and the resilient cover members which completely frees these incompatible members from each other so far as expansion, contraction and deflection stresses are concerned. Connections at the corners of the frame assembly 13 are made by way of welded or bonded joints for the resilient cover members while the metal structural members are aligned on rigid metal angles by a slip-fit connection.

Figure 6:
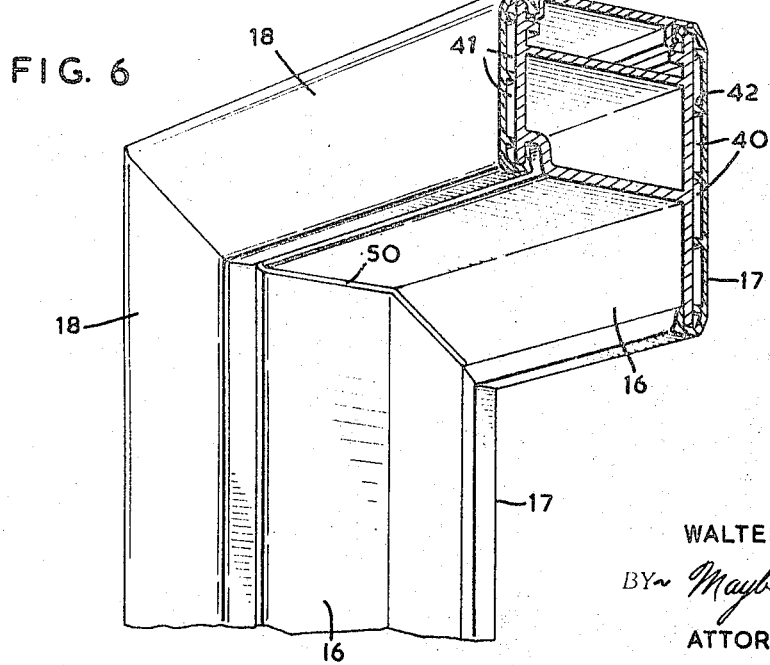
FIGURE 6 shows a view in assembled configuration, of the corner section depicted in FIGURE 5.

The corner connections of the members of the frame assembly are shown in detail in FIGURES 5 and 6 with FIGURE 5 showing an exploded view and FIGURE 6 depicting an assembled view, the glass assembly and glazing stop not being included in order to more conveniently illustrate the corner connections. Referring to FIGURE 5, rigid plastic, such as polyvinyl chloride, corner angles 43 and 44 are shown slip-fitted between the outer sheaths 17, 18, respectively, and the upper section of the metal reinforcing member 16. The angles 43 and 44 are then slip fitted between the sheaths and the lower section of the metal frame in the direction of arorws 45. As shown by the lower section in FIGURE 5 the spacer ribs 42 are removed from the end portions of the sheaths 17 and 18 to accommodate the rigid plastic angles 43 and 44. Welds or bonds are made between the angles 43, 44 and the sheaths 17, 18.

At the same time that the corners are being fitted together by way of the plastic angles 43 and 44 the metal reinforcing frame sections are aligned at the corners by way of a rigid metal angle 46. The angle 46 is slip-fitted into the upper section of the metal member 16 and the angles 43 and 44 are then fitted and bonded into the upper and lower members 16 of the frame with the lower arm of the angle 46 slip-fitting at the same time into the lower member 16 of the frame. Groove 47 is shown in the lower member of the frame, into which the angle 46 is fitted, with a similar groove 48 appearing in the upper member of the frame.

Referring now to FIGURE 6, the assembled corner section of the frame assembly is shown without the glazing stop affixed thereto or glass assembly set therein. Thus, the two sections of the outer sheath 17 and the two sections of the inner sheath 18 are shown abutting at the angles of the frame. The members 16 of the metal frame are seen to be assembled at the corner with a space 50 provided therebetween to allow for thermal expansion and deflection in the plane of the glass. After the corner assemblage has been completed the cover strip 20 is slip-fitted or snapped into place, as shown in FIGURE 6.

It can be seen that the glass holding structure embodying the present invention provides an attractive and easily assembled metal reinforced unit which has all exposed surfaces completely insulated and which can be easily installed in a window or door frame. Installation and special features of the frame assembly adapted especially for a sliding door and stationary panel unit are further illustrated in FIGURES 2, 3 and 4 of the drawings.

Referring to FIGURE 2, a section through both the sliding door 10 and the stationary panel 11, as installed on the sill assembly 51, is shown. The sliding door 10 has tandem roller cages 52 installed thereon which allow the door to roll on track 53. The sill assembly 51 is seen to be tilted to be higher on the inside in order to combat entry of moisture and is composed of metal members 54 and 55 with a rigid plastic member 56 fitted therebetween to provide a thermal barrier in the sill. The stationary panel 11 rests on a rigid support 57 which also acts as a thermal barrier. Soft, resilient splines 49, 58 and 59 are inserted in recesses 60 and 61, respectively, in the cover strips 20 and act as weatherstripping along the bottom of the door and panel.

Referring to FIGURE 3, a section through the sliding door 10 and the stationary panel 11, as installed in the head 62 of the door frame, is shown. The sliding door 10 is seen to be installed and slide in the horizontal receiving member or head channel 14 which is supported in the frame between stop 63 and moldboard 64. The receiving member 14 is advantageously comprised of a metal reinforcing member 65 covered with resilient plastic sheaths 66 in a manner similar to that used for the metal member 16. The sheaths 66 are seen to embracingly fit around the sides of the metal member 65 by way of end portions 67 and 68. The sheaths are attached to the metal member by a slide-on or snap-on fit and the walls of the sheaths are spaced from the walls of the metal member by way of inner projecting portions or ribs 69, thereby providing spaces 70 between sheath and metal member. Weather seals 71 are provided between the receiving member 14 and the frame of the sliding door 10, the seals 71 being set in recesses 72 in the end portion 68 of the sheaths 66. The receiving member 14 is seen to have channels 73 formed thereon to receive a metal corner angle for attachment to the vertical receiving member 15, described hereinafter.

The stationary panel 11 may be provided with a weather seal 74 running along the inside of the door against the channel 14 and being set in recess 75 of a projecting portion 76 formed in the cover strip 20. A screen channel 77, attached to the stop 63, completes the door assembly, and acts to position the stationary panel against the head channel 14.

It is to be noted from FIGURE 3 that room over the glass panes is allowed by spaces 78 in the top of the panel assemblies to account for vertical contraction, expansion and deflection in the glass and frame. At the same time frame contraction, expansion and deflection is allowed for by the spaces between the stationary panel 11 and the stop 63 and between the sliding door 10 and the top of the channel 14.

Referring now to FIGURE 4, a horizontal broken section through the sliding door 10 and the stationary panel 11, as installed in the side frames 79 of the door frame, is depicted. The sliding door 10, in the closed position is admitted into and held by the vertical receiving member or side channel 15 which is installed in the side frame 79 between stop 80 and moldboard 81. The side channel 15 has the same construction as the head channel 14, described in conjunction with FIGURE 3, comprising a metal reinforcing member 82, plastic sheaths 83 having end portions 84 and 85 and inner projecting ribs 86 forming spaces 87 between the metal member 82 and the sheaths 83. Weather seals 88 are provided in the side channel 15, as with head channel 14, riding against the door 10. The side receiving member 15 has channels 89 formed thereon to receive the corner angle attaching it to the horizontal receiving member 14, as described hereinbefore. The corner connection of the members 14 and 15, i.e., the connection of the sheath members and the metal members together, is carried out in exactly the same way as that described in conjunction with FIGURES 5 and 6 of the drawings, with no direct connection between metal and resilient plastic members.

The stationary panel 11 is set against the side frame between stops 90 and 91 and a soft plastic or rubber weatherstrip 92 is set in groove 93 in the stop 89, bearing against the stationary panel 11. Rigid vinyl splines 94 and 95 are formed on the sheath 17 and the sheath 18 of the sliding door 10 and the stationary panel 11, respectively, with these splines meeting and acting as stops when the sliding door closes. Also, the splines 94 and 95 provide a rigid seal in the space between the door and panel in the closed position. At the same time, soft plastic splines 96 and 97 are provided on the door and panel, set in recesses 98 and 99 in the sheaths 17 and 18, respectively, thereby forming two flexible weather stops between the door and panel in the closed position. It is to be noted from FIGURE 4 that spaces 100 between the sides of the glass sheet structures and the metal frames 16 provide room to allow for horizontal contraction, expansion and deflection in the glass and frames.

The door assembly just described, which utilizes a novel glass pane receiving and holding structure embodying the invention, has a special woodframe design which allows installation of either a right or a left hand door by merely alternately locating the stops on the right and left sides of the door frame, as illustrated in FIGURE 4. Also, a new installation of the door assembly need not be preceded by precise sizing of the door opening, since by use of stops of proper size the desired size of opening can be prepared very readily. Furthermore, replacement of any six foot stock door by the aforedescribed assembly can be rapidly accomplished by merely attaching the proper stops to the door frame.

The insulated glass pane or panel receiving and holding frame described herein, although described by way of example in conjunction with use for insulglazed or double glazed doors, is, as aforementioned, equally as applicable for utilization in single glazed doors or in insulglazed or double or single windows. Also, the glass panes may be replaced by insulated or non-insulated wooden panels or panels of other suitable building materials. Furthermore the insulated reinforcing member of the present invention is easily adaptable for use with structural building panels.

Thus, metal reinforcing members covered with resilient but fairly rigid insulating materials, embodying the invention, may be used for joining structural building panels to form a strong wall member of pleasing appearance which is easily and quickly assembled.

Referring to FIGURE 7 of the drawings a structural panel receiving and holding member 101 is shown joining structural panels 102 each of which is depicted in FIGURE 7 as being a composite panel constructed of an enamelled metal outside sheet 103 and an inner sheet of fibre board 103a with insulation 104 therebetween. The sheet 103 may, of course, be any other type of weather-resistant building material and the sheet 103a any other type of interior building material such as one of the asbestos containing boards. The member 101 is seen to comprise a rigid metal reinforcing member 105 with a web portion 106 and two arms 107, 108, one at each end of the web 106 and extending normally from each side thereof. Two sheaths 109, 110 of resilient material of low thermal-conductivity, such as polyvinyl chloride, cover the outer portions of the metal member 105, with the first second sheaths 109 and 110 engaging fitting over and covering the arms 107 and 108 respectively. Portions 111 of the sheaths 109, 110 are shown enbracing the inner walls of the arms 107, 108. The sheaths are easily attached to the metal reinforcing member by a slide-on or snap-on fit. The arms 107, 108, with sheaths 109, 110 thereon, are seen to define a structural panel receiving opening on each side of the web 106. Weather-tight contact is provided between the sheets 103, 103a and the portions 111 of the sheaths 109, 110 by way of a water-tight sealant or by means of a soft facing material bonded to the portions 111 of the sheaths.

Advantageously, the sheaths 109, 110 have inner projecting portions 112 thereon which act to form an insulating space between sheath and metal reinforcing member. It can be seen that the metal reinforcing member 105 has all exterior faces completely covered and insulated by resilient sheaths of low thermal conductivity. Furthermore, utilization of this structural member described in conjunction with FIGURE 7, embodying the invention, allows the easy and rapid assembling of building panels of attractive appearance, strongly reinforced by metal members completely covered by insulating materials.

What I claim as my invention is:

1. A glass pane receiving and holding structure comprising a rigid metal reinforcing frame and covering members of rigidly resilient material attached to and covering said metal frame, said metal frame being comprised of rigid metal reinforcing members each having a web portion, two arms, one at each end of and extending normally from each side of the web portion, a first channel portion formed by the two arms and extending outwardly in the frame from the web portion, one of said arms at one end of the web portion having an elongated portion extending inwardly from one side of the web, and each reinforcing member also having a second, smaller, upset channel portion located on the oposite end and on the same side of the web as the elongated portion of said one arm with open side of said upset channel facing inwardly on the frame, and said covering members of rigidly resilient material being comprised of a first sheath member engagingly fitted over and covering said one arm at one end of the web portion, including the elongated portion, of the metal reinforcing member, a second sheath member engagingly fitted over and covering the other of said arms, said first and second sheaths having inside projecting portions forming a space between sheath and reinforcing member, a glazing spline inserted in the upset second channel portion of the reinforcing member to form a glass pane receiving opening between the elongated portion of said one arm of the reinforcing member and said spline, and a cover strip engagingly fitted across the first channel portion of the metal reinforcing member between the first and second sheaths, the frame incorporating rigid corner members which are of a material similar to said covering members and which bond said sheath members together at the frame corners, and slip-fit metal corner members which align, but are unsecured to, the metal reinforcing members at the frame corners, and the metal reinforcing members at the frame corners being spaced a distance apart.

2. A glass pane receiving and holding structure as claimed in claim 1 wherein the glazing spline is biased inwardly to provide a positive holding action against a glass pane inserted in the glass pane receiving opening.

3. A glass pane receiving and holding structure as claimed in claim 1 wherein the members of resilient material are thermosetting plastic.

4. A glass pane receiving and holding structure comprising a rigid metal reinforcing frame incorporating rigid metal reinforcing member each having a web portion, and two arms, one at each end of and extending normally from each side of the web portion, one of said arms at one end of the web portion having an elongated portion extending inwardly from one side of the web, and each reinforcing member also having an upset channel portion located on the opposite end and on the same side of the web as the elongated portion of said one arm with open side of said upset channel facing inwardly on the frame, a first sheath of rigidly resilient material engagingly fitted over and covering said one arm at one end of the web portion, including the elongated portion, of the reinforcing member, a second sheath of rigidly resilient material engagingly fitted over and covering the other of said arms, spacer means between said first and second sheaths and each reinforcing member forming a space therebetween, a spline adapted to be inserted in the upset channel portion of the reinforcing member to form a glass pane receiving opening between the elongated portion of said one arm of the reinforcing member and said spline, a cover strip of rigidly resilient material engagingly fitted between the first and second sheaths across the side of the reinforcing member opposite the glass pane receiving opening, corner members which bond the sheaths together at the frame corners, and slip-fit metal corner members which align, but are unsecured to, the metal reinforcing members at the frame corners, the metal reinforcing members being at the frame corners spaced a distance apart and being longitudinally movable relative to the sheaths when subjected to thermal expansion or contraction.

5. A glass pane receiving and holding structure as claimed in claim 5 wherein the members of resilient material are thermosetting plastic.

6. A glass pane receiving and holding structure comprising a rigid metal reinforcing frame incorporating rigid metal reinforcing members each having a web portion, and two arms, one at each end of and extending normally from each side of the web portion, one of said arms at one end of the web portion having an elongated portion extending inwardly from one side of the web, and each reinforcing member also having an upset channel portion located on the opposite end and on the same side of the web as the elongated portion of said one arm, a first sheath of rigidly resilient material engagingly fitted over and covering said one arm at one end of the web portion including the elongated portion, a second sheath of rigidly resilient material engagingly fitted over and covering the other of said arms, a spline adapted to be inserted in the upset channel portion of the reinforcing member to form a glass pane receiving opening between the elongated portion of said one arm of the reinforcing member and said spline, corner members which bond the sheaths together at the frame corners, and slip-fit metal corner members which align, but are unsecured to, the metal reinforcing members at the frame corners, the metal reinforcing members being longitudinally movable relative to the sheaths when subjected to thermal expansion or contraction.

7. A glass pane receiving and holding structure as claimed in claim 6 wherein the first and second sheaths have inside projecting portions thereon forming a space between the sheaths and each reinforcing member.

8. A glass pane receiving and holding structure as claimed in claim 6 wherein a cover strip of rigidly resilient material is engagingly fitted between the first and second sheaths across the side of each reinforcing member opposite the glass pane receiving opening.

9. A structural panel receiving and holding structure comprising a rigid metal reinforcing frame incorporating rigid metal reinforcing members each having a web portion and two arms, one at each end of and extending normally from each side of the web portion, a first sheath of rigidly resilient material engagingly fitted over and covering one of said arms, a second sheath of rigidly resilient material engagingly fitted over and covering the other of said arms, said two arms covered with said resilient material forming a structural panel receiving opening therebetween, corner members which bond the sheaths together at the frame corners, and slip-fit corner members which align, but are unsecured to, the metal reinforcing members at the frame corners, the metal reinforcing members being longitudinally movable relative to the sheaths.

10. A structural panel receiving and holding structure comprising a rigid metal reinforcing frame incorporating rigid metal reinforcing members each having a web portion and two arms, one at each end of and extending normally from each side of the web portion, a first sheath of rigidly resilient material engagingly fitted over and covering one of said arms, a second sheath of rigidly resilient material engagingly fitted over and covering the other of said arms, spacer means between said first and second sheaths and each reinforcing member forming a space therebetween, said two arms covered with said resilient material forming structural panel receiving openings therebetween on both sides of the web portion of the reinforcing member, corner members which bond the sheaths together at the frame corners, and slip-fit corner members which align, but are unsecured to, the metal reinforcing members at the frame corners, the metal reinforcing members being longitudinally movable relative to the sheaths.

11. A structural panel receiving and holding structure comprising a rigid metal reinforcing frame incorporating rigid metal reinforcing members each having a web portion, and two arms, one at each end of and extending normally from each side of the web portion, one of said arms at one end of the web portion having an elongated portion extending inwardly from one side of the web, and also having an upset channel portion located on the opposite end and on the same side of the web as the elongated portion of said one arm, a first sheath of rigidly resilient material engagingly fitted over and covering said one arm at one end of the web portion including the elongated portion, a second sheath of rigidly resilient material engagingly fitted over and covering the other of said arms, a spline adapted to be inserted in the upset channel portion of the reinforcing member to form a structural panel receiving opening between the elongated portion of said one arm of the reinforcing member and said spline, corner members which bond the sheaths together at the frame corners, and slip-fit corner members which align, but are unsecured to, the metal reinforcing members at the frame corners, the metal reinforcing members being longitudinally movable relative to the sheaths.

12. A structural panel receiving and holding structure as claimed in claim 11 wherein spacer means are disposed between the first and second sheaths and each reinforcing member, the spacer means forming a space between sheath and reinforcing member.

References Cited

UNITED STATES PATENTS

| | | | |
|---|---|---|---|
| 2,837,784 | 6/1958 | Jannette | 52—400 |
| 3,023,466 | 3/1962 | Landis | 49—493 X |
| 3,040,389 | 6/1962 | Fengler | 52—400 X |
| 3,090,083 | 5/1963 | Emmerich | 52—400 X |
| 3,112,534 | 12/1963 | Winnan | 52—401 |
| 3,269,074 | 8/1966 | Darmstadt | 52—502 |

FOREIGN PATENTS 877,294    9/1961    Great Britain.

DAVID J. WILLIAMOWSKY, *Primary Examiner.*

D. L. TAYLOR, *Assistant Examiner.*